Feb. 28, 1933.  A. I. MARCUM  1,899,240
FRONT AXLE DRIVE
Filed June 18, 1928  4 Sheets-Sheet 1
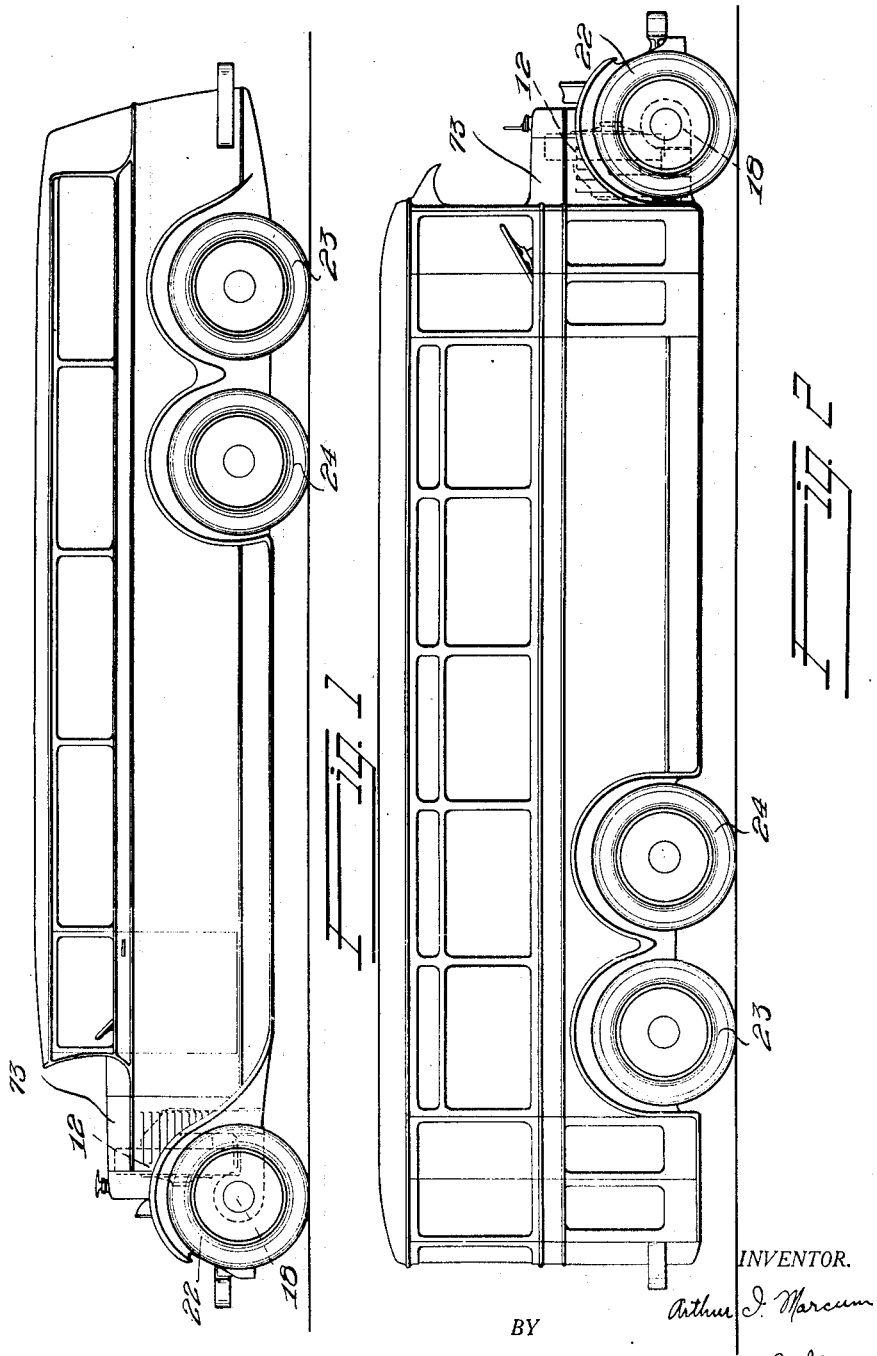
INVENTOR.
Arthur I. Marcum
BY
William A. Strauch
ATTORNEY.

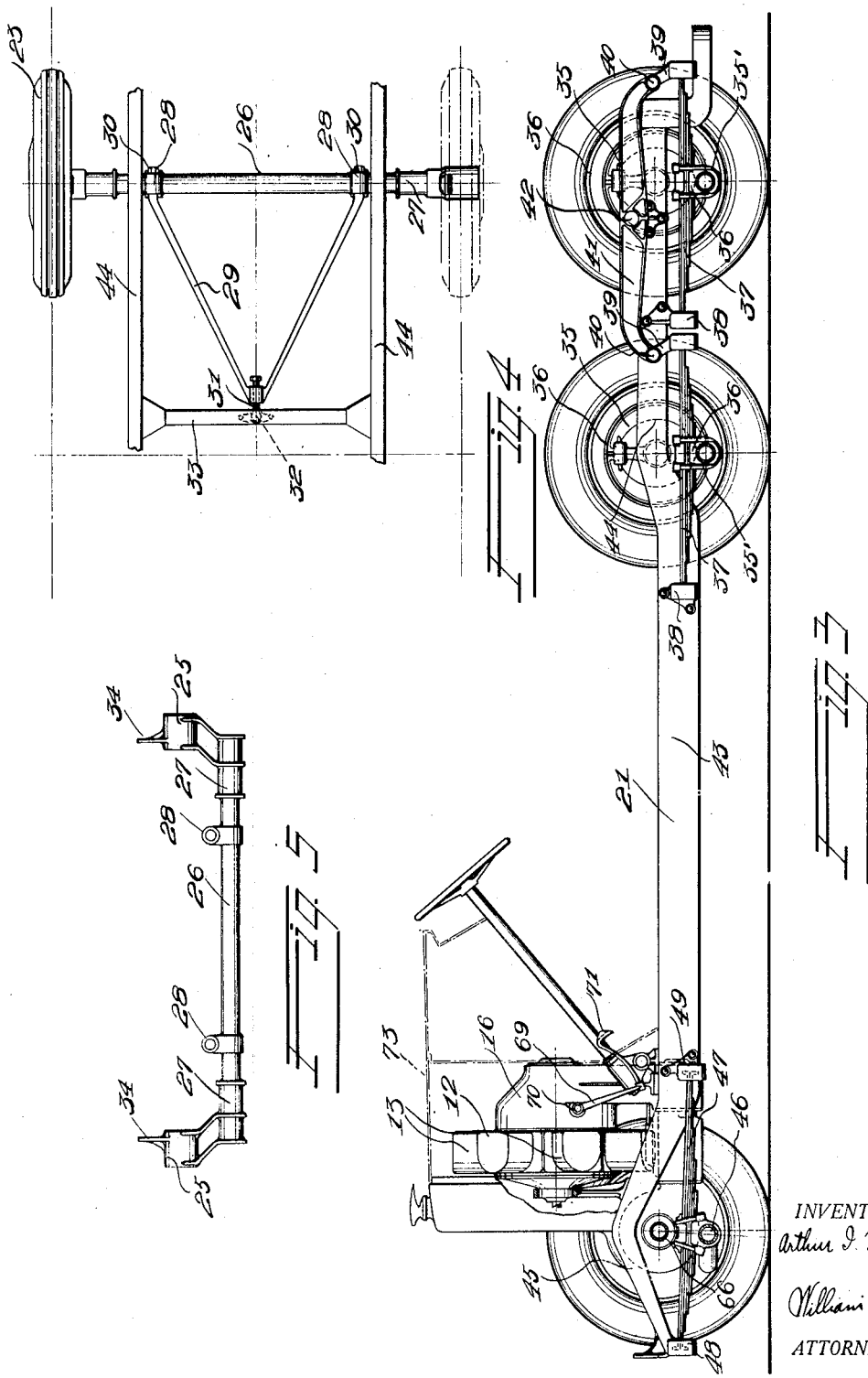

Feb. 28, 1933.  A. I. MARCUM  1,899,240
FRONT AXLE DRIVE
Filed June 18, 1928   4 Sheets-Sheet 3
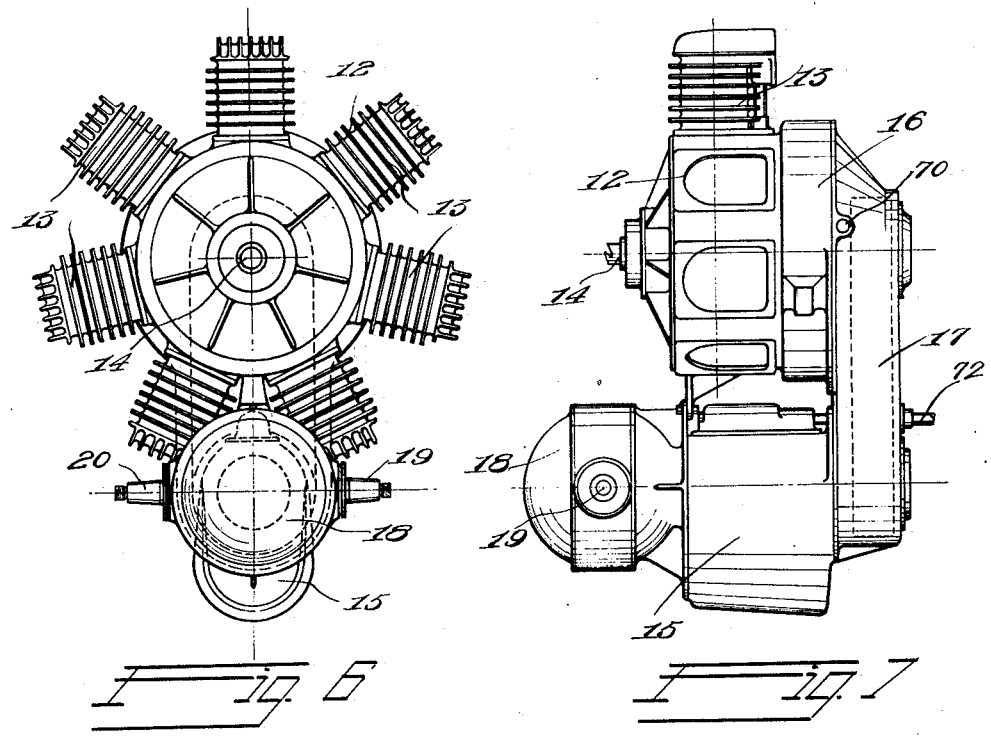
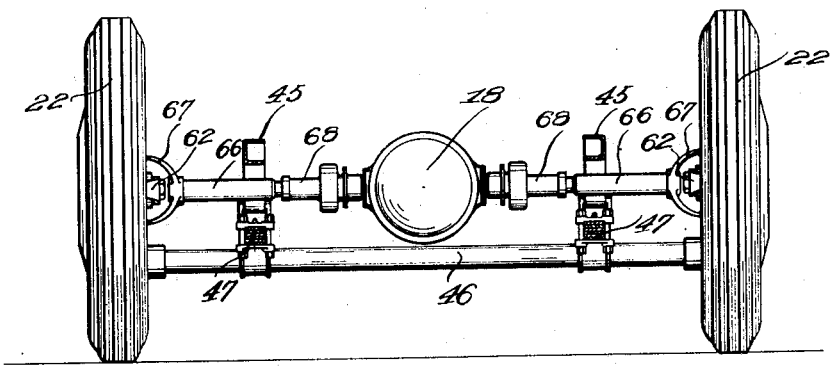
Inventor
Arthur I. Marcum
By William A. Strauch
Attorney

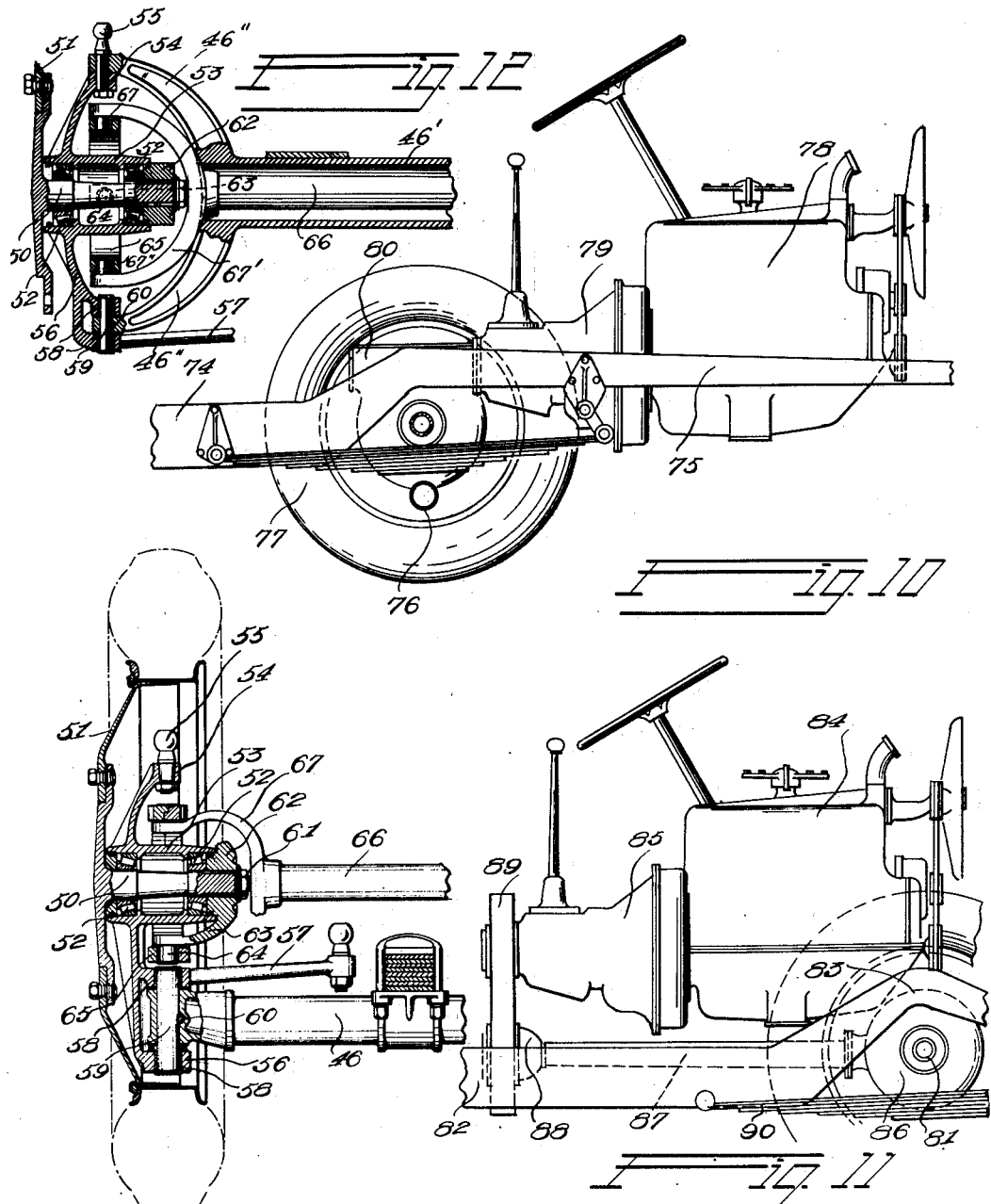

Patented Feb. 28, 1933

1,899,240

UNITED STATES PATENT OFFICE

ARTHUR I. MARCUM, OF OAKLAND, CALIFORNIA

FRONT AXLE DRIVE

Application filed June 18, 1928. Serial No. 286,267.

This invention relates particularly to road vehicles. It is well known, that the axles of road vehicles are subjected to rapid movements toward and from the frame of the vehicle as it moves over rough roads, and this movement is present even when the vehicle moves over relatively smooth roads at high speed. The general practice heretofore has been to drive the rear wheels of the vehicle and to support the motor on the frame adjacent the front end thereof. This arrangement required the use of relatively long shafts connecting the frame carried motor to the rear axle, especially in trucks and busses. These shafts are subjected to rapid pendular movements as the axles vibrate. Said shafts were thus subjected to destructive stresses, excessive movement of the spline connection ordinarily included, and the flexibility of movement of the rear axle was restricted, unless the shaft was made flexible to a substantial degree. In the latter event, the shaft assumed various angles during the operation of the vehicle causing losses in the transmission of the power to the rear axle or axles. In multi-wheel road vehicles these disadvantageous results are multiplied due to the fact that in such vehicles the rear wheels are connected together and to the frame so that each axle is capable of substantial swinging movement independent of that resulting from the deflection of the springs. In practice, multi-wheel road vehicles must be constructed with the freedom of movement just referred to, since in order to dispense with the steering of one of the two sets of rear wheels, said wheels must be brought together, endwise of the frame, and when brought together for this reason it becomes especially important that each axle be free to rise or fall independent of the deflection of the springs, since if such construction were not provided, when one of the wheels on one side of the vehicle rises over an elevation the immediately adjacent wheel might leave the ground, resulting in loss of traction.

Moreover, in the usual construction the driving of the rear wheels from a forwardly disposed motor introduces unnecessary dead weight into the construction of the vehicle, the rear axle or axles being relatively heavy due to the fact that they include the usual differential mechanism. Furthermore, in trucks and busses the weight of the motor is largely on the forward axle while the extraneous load is largely carried on the rear axles in multi-wheel constructions. Accordingly, when the truck or bus is loaded substantially no difficulties due to loss of traction arise even though the load on the rear portion of the frame is distributed on two axles. However, when the bus or truck is unloaded, the load on the rear axles may be reduced to such extent that loss of traction between the wheels and the road may result on severe grades.

By this invention it is proposed to overcome the above and other difficulties incident to the operation of road vehicles, particularly of the multi-wheel type, by utilizing the forward axle solely as the drive axle of the vehicle, thus dispensing entirely with the flexible drive shaft customarily utilized to transmit the power of the motor to the rear axle or axles, and avoiding the use of heavy rear axles. The rear axle or axles accordingly can remain entirely free to move with respect to each other and to the frame without adversely effecting the transmission of power, while the forward axle, which sustains the major portion of the weight of the motor without regard to the loaded condition of the vehicle, always carries sufficient weight to maintain a satisfactory degree of traction between the wheels carried thereby and the road under all conditions of service.

The primary object of this invention, accordingly, is to provide a road vehicle having a drive axle disposed forwardly of the frame substantially beneath the motor, other wheels of the vehicle being non-driven wheels.

A further object of the invention is to provide a road vehicle in which the axes of the motor cylinders are disposed in a plane that is transverse with respect to the length of the vehicle, rather than substantially parallel thereto, whereby space is conserved to carry the body forwardly to a point close to the forward end of the frame, and whereby the weight of the power unit is brought substantially over the driven axle.

A further object of this invention is to provide a road vehicle embodying a motor of the radial type disposed transversely of the frame in which the transmission mechanism is disposed beneath the motor to the end that the floor line of the body may be maintained at a constant level to a point immediately adjacent the engine.

A still further object of the invention is to provide a road vehicle including an internal combustion engine disposed forwardly of the frame and in which the wheels on the forward axle alone are driven by a short flexible shaft, whereby the rear axle or axles may remain entirely free of connection to said engine and can partake of relatively great movements without resulting in large losses of power due to the angularity of the propeller shaft or shaft sections.

Other objects of the invention will appear as a description thereof, proceeds with reference to the accompanying drawings in which:—

Figure 1 is a side elevation of a road vehicle construction in accordance with the preferred form of the invention.

Figure 2 is a side elevation of a modified form of road vehicle.

Figure 3 is a side elevation of the chassis of the improved road vehicle.

Figure 4 is a detail plan view showing the means to resist the brake reactions on the rear axle.

Figure 5 is a side view of one of the rear axles.

Figure 6 is an end elevation on a larger scale of the power unit and transmission mechanism embodying a radial motor.

Figure 7 is a side elevation on the same scale of the unit appearing in Figure 6.

Figure 8 is a sectional detail view showing the manner of driving the front axle.

Figure 9 is a vertical section through one of the front wheels, parts of the driving forks of the universal joint being broken away and one of said forks being shifted approximately 90° out of true position to show the construction more clearly.

Figure 10 is a side elevation of the forward end of a vehicle including a further modified form of the invention.

Figure 11 is a side elevation of still another modification of the invention.

Figure 12 is a fragmentary vertical sectional view disclosing a modification of the construction disclosed in Figure 9.

Like reference characters indicate like parts throughout the several figures.

The road vehicle to which the novel drive arrangement of this application is applied is preferably of the type that includes a single forward axle and two rear axles, each axle being supported by a pair of road engaging wheels. In this invention, it is proposed to propel the vehicle by driving the two wheels that are mounted upon the single forward axle and by these wheels alone. In the preferred form of the invention the power unit comprises a motor 12 having the cylinders 13 extending radially from the axis of a drive shaft 14, such motors being in themselves well known. Secured beneath the motor 12 and attached to the housing thereof is a casing 15 containing the usual gears for varying the torque applied to the driven forward axle. Attached to one side of the motor 12 is the casing 16 containing the usual clutch mechanisms for operatively connecting the engine to the driven axle through the gears included in the casing 15. The numeral 17 indicates a casing that connects the casing 16 and 15, and houses suitable mechanism such as a silent chain for connecting the drive shaft to the torque varying gears contained in the casing 15. Secured to the opposite side of the casing 15 in any well known manner is a differential housing 18 containing the well known form of differential gearing to differentially drive the stub shafts 19 and 20 that are operatively connected to the several driven forward wheels as presently described. As clearly shown in Figure 7, the internal combustion engine, the clutch, the transmission gearing and the differential are all rigidly secured together to constitute a single power unit that may be applied and removed as a whole from the vehicle in which it is to be used. Said unit is preferably arranged as shown in Figures 6 and 7, in which the torque varying gears of the transmission are disposed in a casing that is arranged beneath the radial engine, while the differential casing is arranged so that it is disposed wholly between the horizontal planes that bound the transmission casing.

The power unit just described is suitably mounted upon the chassis 21 of a road vehicle so that the axes of the cylinders of the radial motor are located in a plane extending transversely of the frame of the vehicle, rather than longitudinally thereof, as is customary. Busses and trucks are of ample width to permit this to be done.

Figures 1 and 2 show vehicles embodying the improved drive arrangement of this invention. As clearly shown in said figures, the power unit just described is disposed in the forward end of the vehicle with the shaft sections 19 and 20 in approximate alignment with the axes of the forward wheels 22 of the vehicle. Said wheels are operatively connected to said shaft sections in a manner presently to be described and serve to alone propel the vehicle over the road.

The rear end of the vehicle is supported on two pairs of wheels 23 and 24, the wheels on each side of the vehicle being disposed relatively close together, whereby steering of the rear wheels may be dispensed with since the deflection of the side walls of the pneumatic tires compensates for the slight relative movement between the wheels in turning the vehicle. To this same end the forward wheels, which are steered, are preferably caused to track about a point that is located in a vertical plane that is substantially midway between the axes of the axles carrying the wheels 23 and 24. Each wheel of the pairs of wheels 23 and 24 is preferably secured to an axle shown in Figures 3, 4 and 5. The wheels 23 and 24 are journalled in end brackets 25 that are rigidly secured to an axle 26 preferably tubular, that is disposed substantially below or in offset relation to the axis of the wheels carried by the axle. This arrangement together with the absence of a relatively large and heavy differential housing upon the rear axles permits the floor line to be brought well below the axes of the wheels permitting the center of gravity of the loaded vehicle to be lowered below that possible under the ordinary construction now in common use. Each of the brackets 25 includes a bearing 27 for connecting it to the frame of the vehicle through the springs presently to be described. Each rear axle 26 also includes a pair of spaced perforated ears 28. A torque resisting frame 29, preferably in the form of a V having the ends of the legs of the V disposed to enter the perforated ears 28, is rigidly secured to the axle by nuts 30. Said frame projects forwardly in a substantially horizontal plane and is provided with a bore that fits slidably upon a cylindrical rod 31 that is connected at one end by means of a universal joint 32 to a transverse member 33 of the frame of the vehicle. As clearly shown in Figure 4, the rod 31 is substantially longer than the width of the portion of the torque resisting frame slidably mounted thereon. The arrangement just described permits the axle to move toward and away from the transverse frame members 33 and, at the same time, the axle is free to tilt in its own vertical plane.

Each of the brackets 25 is provided with an upward extension 34 to which the brake shoes 35 may be secured in any well known manner. Said shoes co-operate with the usual brake drum 36 carried by each of the rear wheels. It will be obvious that upon the application of the brakes the rotation of the wheels tend to cause the axles to rotate with the wheels. Such movement is resisted by the torque resisting frame 29 just described, though it permits the axle to partake of all the movements that are permitted by the spring suspension about to be described.

Said spring suspension is shown best in Figure 3. Secured to the bearing portions 27 of each of the rear axles by means of clips 35' and blocks 36 is a leaf spring assembly 37. One end of each of the spring assemblies 37 is secured to the frame of the chassis by a bracket 38, including rubber or similar blocks, that permit each spring to swing relatively freely with respect to said bracket as its center. If desired, the spring 37 may be directly pivoted to the frame at one end. The opposite end of each of the springs 37, at the same side of the vehicle, is connected by means of a link 39 secured adjacent one end to the free end of the spring 37 and connected at its opposite end by a pin 40 to an end of an equalizing lever 41 that is pivoted at 42 upon the frame of the vehicle. By the arrangement just described, each axle is free to partake of substantial swinging movement independently of the deflection of the springs as the vehicle moves over major obstructions, and at the same time the shocks applied to the springs individual to one of the axles is transmitted in part through the equalizing levers to the springs that are individual to the other axle at the same side of the vehicle.

The side members 43 of the chassis of the vehicle are provided with a kick-up 44 of relatively small depth due to the fact that the rear axles are offset with respect to the centers of the wheels. The forward end of the frame 43 is provided with a kick-up 45 of relatively greater depth in order to clear the forward axle. The frame side members throughout the major portion of the longitudinal extent of the vehicle, that is ordinarily used for passenger carrying purposes, is at an extremely low level. The forward axle 46 is secured by means of springs 47 rigidly connected between their ends to said axle. The forward end of each of the springs 47 is secured in a socket 48 by means of suitably secured rubber or similar blocks. The opposite end of each of the springs 47 is secured in a socket of a casting 49 suitably secured to the side members 43 of the frame of the vehicle.

The forward or driven wheels (Figure 9) each comprises a spindle 50 carried by a suitable dished wheel 51. Rotatably mounted on bearings 52 disposed on the spindle 50 is a hub section 53 provided with an upwardly projecting arm 54 having a member 55 arranged to support the end of a rod designed to resist the torque reactions, if it be desired to employ such a rod. The hub section 53 is also provided with a downwardly projecting arm 56 to which is secured the steering arm 57 arranged to receive the steering mechanism of the vehicle in well known manner. The arm 56 is also provided with bearings 58 to receive a king pin 59 removably secured by means of a pin 60 to one end of the axle 46 the arrangement being such that the wheel may be swung about said king pin when the arm 57 is caused to move by the steering mechanism of the vehicle.

Keyed to the inner end of the spindle 50 and held thereon by a nut 61 is a sleeve 62 provided with arms 63 projecting outwardly above the hub section 53. Each of the arms 63 carries a pin 64. A ring 65 is journalled for rotation about the axis that is common to the pins 64, and said ring is connected to a drive shaft section 66 by means of a pair of arms 67, each of which is connected to said ring by pins whose axes are disposed at right angles to the axes of the pins 64, as will be better understood by reference to Figure 12 and the description thereof which follows later. By this arrangement, a universal connection is provided between the shaft section 66 and the spindle 50 of the wheel. It will be observed that the center of universal motion, as well as the axis of the king pin 59, are located in the substantially vertical plane that bisects the wheel about the axis of the king pin whereby steering is rendered relatively easy due to the fact that substantially no unbalanced forces are set up in the normal operation of the forwardly disposed wheels.

The stub shaft sections 19 and 20 (Figure 6) are operatively connected to the shaft sections 66 before referred to, by suitable connecting shafts 68 the shafts sections 66 and 68 being connected together in a manner that permits said shafts to flex between their ends and to be extended endwise as the wheels 22 move with respect to the differential housing 18 carried by the frame of the vehicle. Said movement is not great because the extent of movement is simply that permitted by the deflection of the springs.

The clutch contained within the housing 16 is controlled by a lever 69 secured to a shaft 70 and controlled by a foot pedal 71 rigidly secured thereto. The gears are shifted in well known manner by means of a lever disposed within the body of the vehicle and operatively connected with the shaft 72.

It will be observed that by the construction just described, the hood 73 of the vehicles shown in Figures 1 and 2 may be made about one-third the length of the ordinary hood providing greater passenger carrying space within the body of the vehicle for a given wheel base. It will also be observed that the power plant including all of the operating connections are secured together and constitute a unitary construction that is disposed forwardly of the vehicle and relatively close to the forward or driven axle. The weight of this unit is accordingly always largely upon the forward axle without regard to whether the vehicle is loaded or unloaded. As a result, good traction can always be secured between the driven wheels 22 and the surface of the road. At the same time, the use of relatively long drive shafts extending from a forwardly disposed engine to the rear axles is entirely avoided and said axles can be made of relatively small weight and of extremely simple construction. Furthermore, if the brakes are confined to the rear wheels the wear on the tires is equalized since the driving force is applied to the forward wheels while the braking forces are applied to the rear wheels. In view of the fact that the vehicle just described does not include the centrally disposed drive shaft nor the differential on the axles the rear axles may be offset below the axes of rotation of the wheels giving an extremely low floor line while still maintaining a proper road clearance. The vehicle may accordingly be operated at high speed without danger of overturning.

In the modification of the invention shown in Figure 10 of the drawings, the invention is shown applied to a motor vehicle embodying an internal combustion engine arranged as such engines are conventionally arranged at the present time. That is, the axes of the cylinders are located in a plane or planes that extend longitudinally rather than transversely of the vehicle. In said figure, the numeral 74 indicates the forward end of one of the frame side members. Said side member is provided with a kick-up 75 and it extends a substantial distance forwardly of the axle 76 that is supported at one end by front wheels 77 in any suitable manner. In this modification of the invention a conventional motor 78 of the type customarily employed is secured to the forwardly projecting portion 75 of the frame of the vehicle. Said motor block carries the customary clutch and transmission mechanism 79. The propeller shaft extends from the transmission casing 79 to the differential casing 80 that is rigidly secured to the transmission casing and serves to transmit the power of the motor directly to the wheels 77 carried by the axles 76 through a differential mounted in the casing 80. In this form of the invention, it will be observed that the weight of the motor is disposed largely upon the forward or driven axle and that all of the driving mechanism for the vehicle is included in a unitary power plant that may be removed as a whole from the vehicle. Inasmuch as the power unit just referred to is mounted upon a portion of the frame that extends forwardly from the axle and that there is an absence of a drive shaft extending rearwardly of the forward axle the floor line may be brought very low and substantially all of the space to the rear of the front axle may be utilized for carrying passengers or freight.

In the form of the invention shown in Figure 11 the forward axle 81 is disposed close to the extreme end of the frame 82 beneath a kick-up 83 provided in said frame so that the main portion thereof may be close to the ground. In this form of the invention, the internal combustion engine 84 and the transmission and clutch casing 85 are secured together in well known manner. The forward axle 81 is provided with a differential housing 86 containing the usual differential. Extending rearwardly from said differential housing 86 is a torque tube 87 housing the propeller shaft of the vehicle. Said torque tube is connected by means of a universal joint 88 to a housing 89 rigidly secured to the end of the transmission mechanism 85 and housing a belt to operatively connect the stub shaft of the transmission mechanism with the propeller shaft contained in the torque tube 87. Preferably the propeller shaft contained in the torque tube 87 is connected to the gear driven by the belt contained in housing 89 by means of a universal joint, the center of which is approximately coincident with the center of the universal joint 88. In this form of the invention, the propeller shaft connecting the forward axle is arranged beneath the engine thus again avoiding the use of shafts extending longitudinally of the vehicle to one or both of the rear axles. The axle 81 is free to move with respect to the frame without introducing destructive strains in the propeller shaft because the said axle is free to move only in accordance with the deflection of the springs 90 that connect it to the frame and because of the provision of the universal joint 88 and the coincident universal joint between the propeller shaft and the gear fixedly mounted within the housing 89.

While I have disclosed arrangements in which the differential housing 18 is carried on the frame and is, accordingly, sprung weight, as will be obvious to those skilled in the art, the differential drive mechanism may be mounted in the usual unsprung load carrying housing with the shaft sections 66 disposed within the housing and the wheels driven by universal joints. Such an arrangement is disclosed in Figure 12, in which shaft sections 66 are disposed within axle housing 46' and provided with arms 67' which are terminally connected to the outer periphery of ring 65 by suitable pins 67'' whose axes are at right angles to the axes of pins 64 which pivotally connect arms 63 of sleeve 62 to ring 65 as above described in connection with Figure 9 in order to provide a universal connection between shaft section 66 and wheel spindle 50. As indicated, housing 46' is provided with oppositely extending arms 46'', the outer one of which is pivotally connected to the outer end of hub section arm 54 by member 55 which further functions to support a torque rod as disclosed with reference to Figure 9 and the inner one, of which is terminally disposed within a bifurcation in arm 56 and pivotally secured to the bifurcated portions of arm 56 by means of king pin 59 seated in bearings 58 in said bifurcated portions. In this form of the invention, steering arm 57 is secured to the inner bifurcated portion.

By disposing shaft sections 66 within housing 46' as disclosed, greater clearance is provided between the housing 46' and the road and furthermore a symmetrical pivotal connection is provided between housing 46' and hub section 53.

The invention may be embodied in other specific forms without departing from the spirit of essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What I claim as my invention is:

1. A road vehicle comprising a frame, an axle disposed beneath the forward end thereof, dirigible wheels on said axle, a power unit including an internal combustion engine supported on said frame substantially over said forwardly disposed axle, means operatively connecting said power unit to the wheels of said forward axle, a pair of relatively movable dead axles disposed adjacent the rear end of said frame, a pair of non-dirigible wheels on each of said last-named axles and free of connection to said power unit, brake mechanism for each non-dirigible wheel and means to resist the brake reactions on said axles, said means permitting the relative movement of said axles and comprising a V-shaped frame rigidly secured to each axle at the ends of the legs of the V, and a pin connected to said frame by a universal joint, said pin being slidably connected to the bight of said V-shaped frame.

2. A road vehicle comprising a frame, an axle disposed forwardly of said frame, a power unit secured to said frame adjacent said forwardly disposed axle, dirigible wheels on said axle, and means operatively connecting said power unit to said dirigible wheels, a pair of axles disposed relatively close together adjacent the rear end of said frame, each of said last named axles being resiliently connected to said frame and to each other so that each is capable of substantial swinging movement with respect to the other and to said frame, non-dirigible wheels on said rearwardly disposed axles and brakes for said last named wheels, said last named wheels being free of connection to said power unit, and said rearwardly disposed axles being disposed substantially below the axes of rotation of the wheels carried thereby and including means to resist the brake reactions without substantially interfering with the free movement of said axles with respect to the frame and to each other.

In testimony whereof I affix my signature.

ARTHUR I. MARCUM.